Aug. 27, 1929.  J. AIKEN  1,726,329
CLUTCH DEVICE
Filed Aug. 11, 1926  2 Sheets-Sheet 1
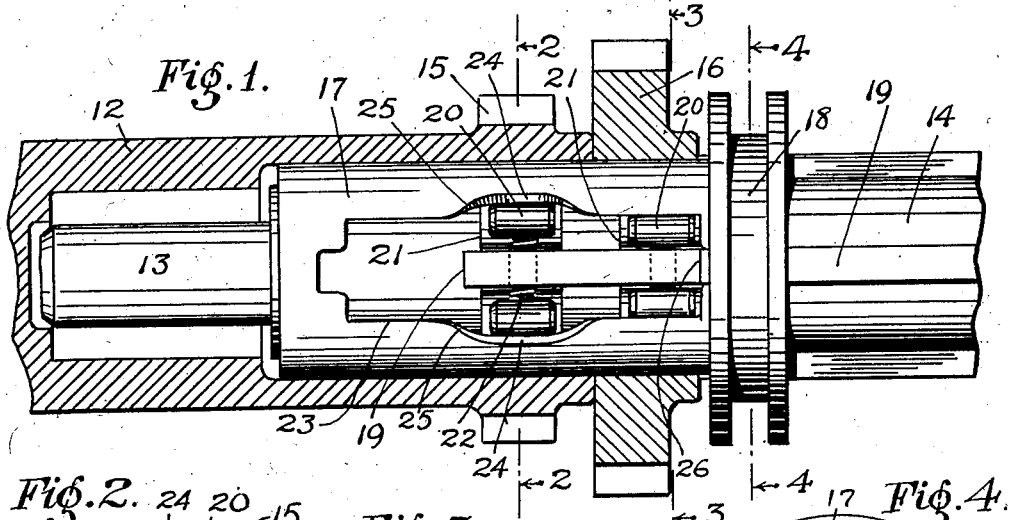
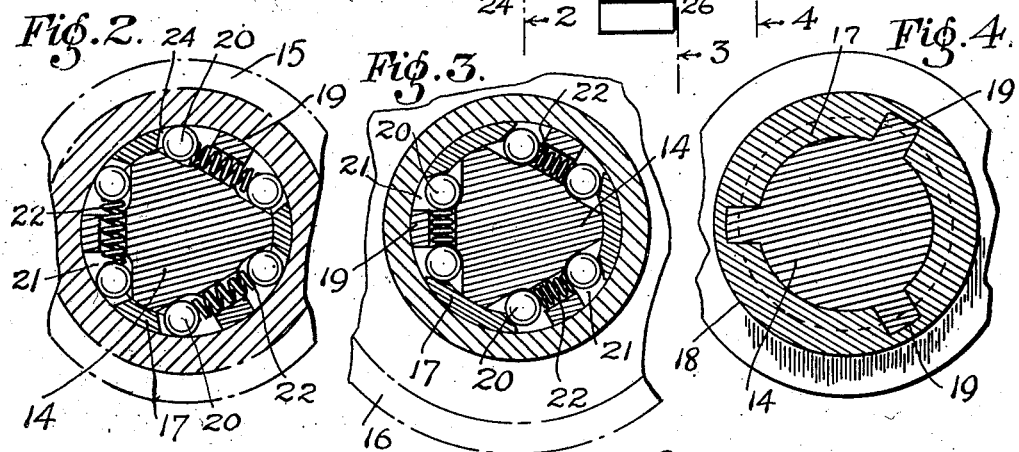
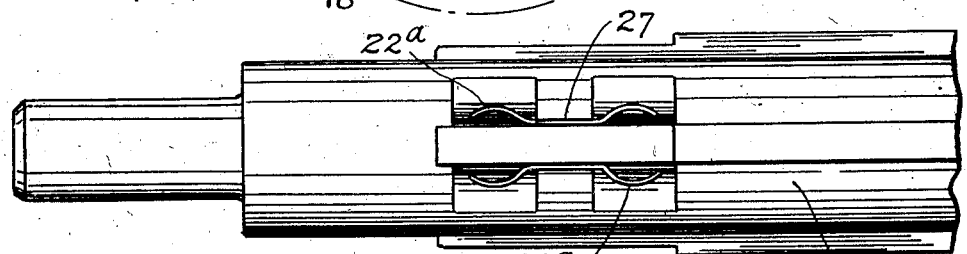
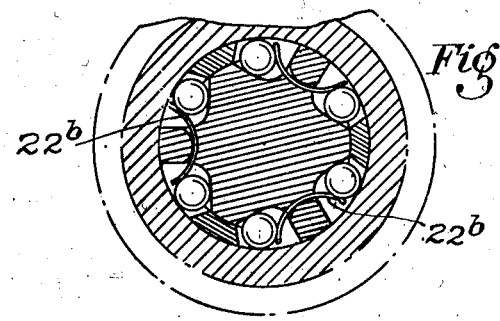
Inventor.
James Aiken

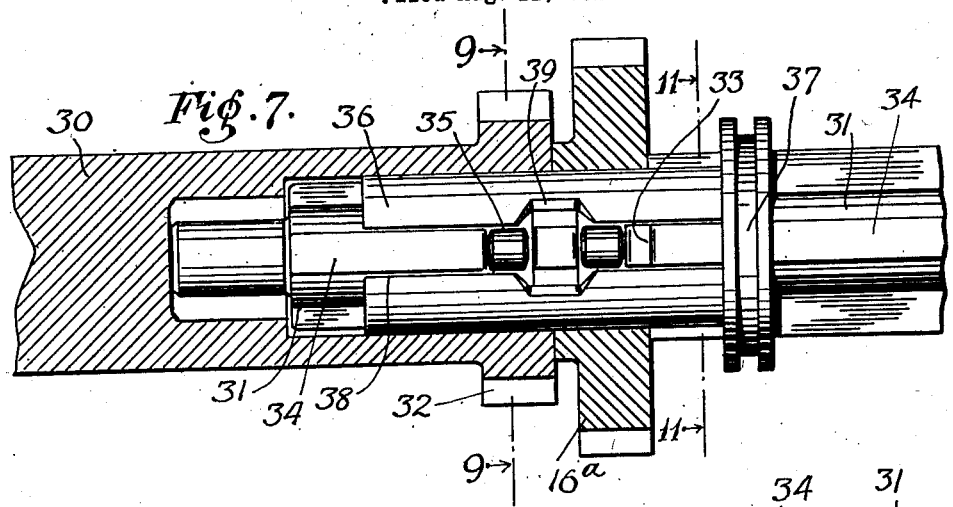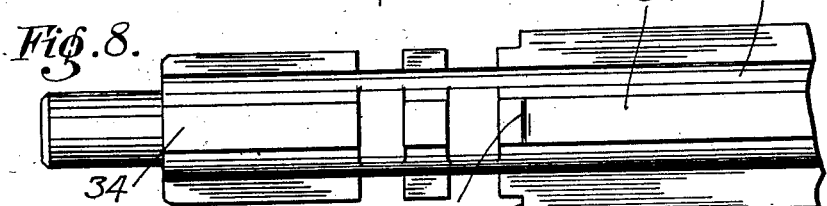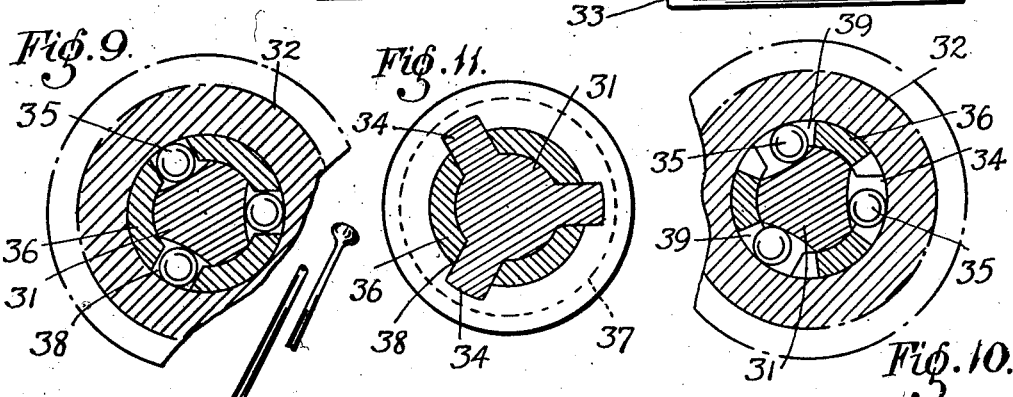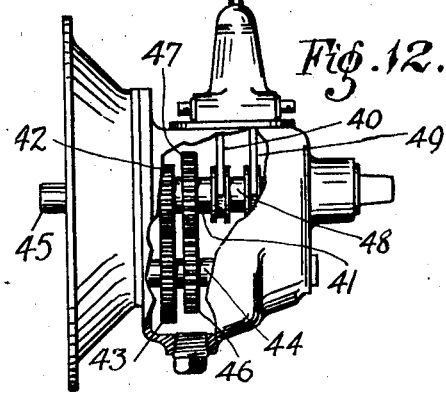

Patented Aug. 27, 1929.

1,726,329

UNITED STATES PATENT OFFICE.

JAMES AIKEN, OF NEW BRIGHTON, NEW YORK.

CLUTCH DEVICE.

Application filed August 11, 1926. Serial No. 128,640.

This invention relates to a clutch device, for use in the transmission of rotary motion, of the type in which wedging members in the form of rollers or the like are adapted to lock between an annular surface on one of the clutch members and suitably shaped surfaces formed on the other clutch member and arranged to converge towards the said annular surface.

One object of the present invention is to provide an improved clutch device which is of simple and strong construction and may be readily adapted for use in automobile or other transmission systems.

A further object of the invention is to provide improved means for moving the locking or wedging members into their locking positions and for disengaging said members from said positions and retaining them in the inoperative position.

In the accompanying drawings, which show by way of illustration or example, different forms of the device;—

Fig. 1 is a side view partly in section of one form of the device.

Fig. 2 is a cross-section taken on the line 2—2, Fig. 1.

Fig. 3 is a cross-section taken on the line 3—3, Fig. 1.

Fig. 4 is a cross-section taken on the line 4—4, Fig. 1.

Fig. 5 is a side view of a shaft showing a modified form.

Fig. 6 is a cross-section corresponding to Fig. 2, but showing another modified form.

Fig. 7 is a view corresponding to Fig. 1, but showing a simplified form of the device.

Fig. 8 is a side view of the shaft 31 of Fig. 7.

Fig. 9 is a cross-section taken on the line 9—9, Fig. 7.

Fig. 10 is a similar view, but showing the parts in the clutching or locking position.

Fig. 11 is a cross-section on the line 11—11, Fig. 7.

Fig. 12 is a side view of an automobile transmission, partly cut away to show the application of this device to the high and second speed drives.

In the arrangement shown at Figures 1 to 4 inclusive, a shaft 12 encloses a ball or roller bearing race surrounding a reduced end 13 on another shaft 14, and two gears 15, 16 are provided, the gear 15 being integral with the shaft 12 and the gear 16 being freely mounted on the shaft 14.

The gears 15, 16 are intended to mesh with suitable gears secured on a counter-shaft and means are provided whereby the shafts 12, 14 may be coupled together to give a direct drive, or the shaft 14 may be coupled to the gear 16 so that the drive is transmitted through the gears and the counter-shaft and the speed change is thus effected.

These figures show an arrangement suitable for an automobile transmission in which the second speed drive is transmitted through constant mesh gears, and the change is effected by sliding a sleeve member 17 in the usual manner. This sleeve 17 has a groove 18 for the reception of the usual operating fork, and is adapted to slide upon the shaft 14 and to extend into the hollow part of the shaft 12. Formed on the shaft 14 are three equally spaced longitudinal ribs or splines 19 which engage correspondingly formed recesses in the right hand end (Fig. 1) of the sleeve 17 so that the sleeve rotates with the shaft 14 but is free to slide longitudinally thereof. The shaft 14 also carries two complete sets of clutching or locking members in the form of rollers, one set being provided within the shaft 12, and the other within the gear 16, and each set comprising three pairs of rollers 20 located in pockets 21 so formed in the shaft 14 adjacent to the ribs 19 as to provide end walls to prevent axial displacement of the rollers 20. Each pocket 21 is so shaped as to form, with the internal cylindrical surface of the interior of the shaft 12 or of the gear 16, a converging chamber within which the rollers 20 may become wedged to lock these parts together. The ribs 19 are provided with holes for the accommodation of springs 22 which are arranged in compression between adjacent rollers 20 and tend to push the said rollers apart and into engagement with the converging surfaces of the said chambers. In Fig. 1 the set of rollers at the left hand side are shown in the engaging position, and the right hand set are in the disengaged position, the sleeve 17 being shown at the extreme end of its travel towards the left. The sleeve 17 is formed with openings 23 to accommodate the rollers 20 and the ends of the ribs 19; and the edges of the openings are formed with oppositely disposed recesses 24 to permit of the spreading and wedging of the rollers in line therewith. The extremities 25 of the recesses 24 are inclined or curved so that disengagement of the rollers from their locking or wedging position is facilitated by a tilting movement being imparted to the rollers by engagement with said extremities 25 when the sleeve 17 is shifted longitudinally to change the gear or to put the transmission in the "neutral" position. In the extreme right hand position of the sleeve 17 (Fig. 1), the recesses 24 are in line with the rollers of the right hand set and the shaft 14 is locked to the gear 16, and in the mid position the recesses 24 are located between the two sets of rollers so that locking or wedging of all the rollers 20 is prevented, and the gear may be set in the "neutral" position or for the low speed or reverse drive which may be obtained in any suitable or well known manner. In the arrangement here shown the gear 16 is held axially in position between the end of the shaft 12 and shoulders 26 formed on the ribs 19.

In Fig. 5 shaft 14ᵃ is shown in side view, and is similar to the shaft 14 of Figs. 1 to 4 except that the shaft 14ᵃ is slotted to carry spring strips 22ᵃ fitted in the slots 27 extending in an axial direction between the adjacent pockets of the two sets for spreading the rollers and moving same into their locking positions when the recesses 24 are in line therewith.

In Fig. 6 another modified form of spring means is illustrated, this arrangement being similar to that shown at Fig. 2 except that (instead of having spring 22) the ribs are pierced or recessed for the reception of strip springs or bent plates 22ᵇ, for the same purpose.

The arrangements shown in Figs. 1 to 6 all include locking members arranged in pairs in oppositely facing converging chambers so that the parts may lock together and operate without lost motion when the driving conditions alter and the engine alternately drives and retards the vehicle through one or other of the two sets of clutching devices. For certain purposes, however, a simple form of device having a slight amount of lost motion under the above conditions may satisfy requirements, and Figs. 7 to 11 show a modified form of the invention in which each set of rollers consists of only three single units. In this modified form the shaft 30 encloses bearings for the end of the shaft 31; a gear 32 is formed integral with the shaft 30, and a second gear 16ᵃ is mounted between the end of the shaft 30 and shoulders 33 on three longitudinal ribs or splines 34 on the shaft 31. The said ribs 34 and the shaft 31 are cut away or recessed to provide pockets for the two sets of rollers 35, these pockets being shaped to form, with the enclosing cylindrical surfaces, roller-containing chambers converging in both directions. A control sleeve 36 has a groove 37 for the usual operating fork and is slotted longitudinally at 38 for the reception of the ribs 34 and rollers 35, the edges of these slots 38 being recessed at 39 to accommodate the rollers when in the locking or wedging position at either side of the said chambers.

Fig. 12 shows an automobile transmission with the direct and second speed forward drive mechanism constructed according to this invention, 40 being the usual gear shift fork which is in this case adapted to operate a control sleeve 41 for the direct and second speed drives, and 42 and 43 are the gears by means of which the counter shaft 44 is driven from the driving shaft 45, and 46 and 47 are the constant mesh gears by means of which the second speed drive is transmitted from the counter shaft 44 to the driven shaft 48. The fork 49 is adapted to effect the necessary shift for the low speed and reverse drives and may operate in any suitable or well known manner to produce the desired result.

It will be understood from the above description and from the following claims that the clutching or locking mechanism may be applied to any pair of rotating elements and is not necessarily embodied in a change speed gear, and on the other hand it will also be evident that the number of sets of clutching devices may be increased to give any desired number of speed changes.

What I claim is:—

1. A clutch device for use in the transmission of rotary motion comprising two clutch members, a smooth annular surface on one of the members, at least one pocket formed in the second member adjacent to said annular surface, a locking member located in the pocket and adapted to form a wedge between the annular surface and the wall of the said pocket an axially movable slotted control member having an inclined surface to directly engage the locking member and move same out of its locking position, and a rib formed on the second clutch member and extending through the slotted member to support the other clutch member.

2. A clutch device comprising driving and driven members one within the other, a smooth cylindrical surface on one of the members, a circumferential series of pairs of oppositely inclined surfaces on the second member, wedging members movably mounted between the inclined surfaces and the cylindrical surface, means for moving adjacent wedging members in opposite directions into wedging engagement with said surfaces, an axially movable control member permanently extending between the wedging members and between the driving and driven members to directly engage adjacent wedging members and move same in opposite directions out of the wedging position, and spaced ribs extending between the driving and driven members and passing through the control member and between the wedging members to maintain proper spaced relation between the driving and driven members.

3. A clutch device comprising a rotary member having a smooth annular surface, a second rotary member having a series of pockets adjacent to said annular surface, wedging elements mounted in said pockets, and walls in said pocekts for limiting axial displacement of said elements, a longitudinally slotted sleeve extending between the two rotary members and having recesses to accommodate the said elements when in their wedging positions, deflecting walls at the extremities of the said recesses to directly engage the wedging elements and force same out of their wedging positions, a series of ribs formed on the second rotary member and extending through the slots in the said sleeve to engage and support the other rotary member, and means whereby the sleeve may be moved in an axial direction to control the clutch device.

4. A clutch device comprising a rotary member having a smooth annular surface, a second rotary member having splines thereon and pockets adjacent to said splines, wedging elements mounted in said pockets, a sleeve splined on the second member and formed with slots accommodating said splines and having their sides recesed for the reception of the wedging elements when the clutch is engaged, the extremities of the recesses being inclined to facilitate disengagement of the wedging elements when the sleeve is moved, the first rotary member being supported upon the outer peripheral surfaces of the sleeve and of the splines, and means for axially shifting the sleeve to control the clutch.

5. A clutch device comprising a rotary member having a smooth annular surface, a second rotary member having a series of pairs of wedging elements, pockets formed in the second member and having end walls for limiting axial displacement of the wedging elements, a sleeve splined on the second member and extending permanently between the two rotary members, the sleeve being slotted longitudinally and formed with recesses in the edges of the slots to provide accommodations for the wedging elements when the clutch is engaged and the extremities of the slots being formed with straight sides to directly engage said elements and retain them in the inoperative position, the first rotary member being supported directly upon the outer surface of the said sleeve and upon the outer surfaces of the splines, and means for moving the sleeve axially upon the splines to control the clutch device.

6. A clutch device of the character described comprising an inner rotary member, longitudinal ribs thereon, a second rotary member supported on said ribs, wedging elements adjacent said ribs, and an axially movable control sleeve engaging both rotary members and having inclined surfaces for directly engaging the wedging elements and moving same into their inoperative positions.

7. A clutch device of the character described comprising an inner rotary member, longitudinal ribs thereon, a second rotary member supported on said ribs, pairs of wedging elements adjacent said ribs, springs accommodated in said ribs and adapted to press said elements into their locking positions, and an axially movable control sleeve extending between the rotary members and having inclined surfaces for directly engaging and moving the wedging elements out of the wedging positions.

8. A clutch device of the character described comprising a splined rotary member, a second rotary member supported upon the outer surfaces of said splines, shoulders on said splines for preventing axial movement of the second rotary member, wedging elements between said members, and an axially movable member having inclined surfaces for directly engaging the said wedging elements and moving same to their inoperative positions.

JAMES AIKEN.